Feb. 26, 1974  J. M. LOVING  3,794,479
SOIL CONDITIONING PROCESS
Original Filed Aug. 28, 1970  3 Sheets-Sheet 1

FIG. I

United States Patent Office 3,794,479
Patented Feb. 26, 1974

3,794,479
SOIL CONDITIONING PROCESS
John M. Loving, 404 E. Anderson Ave.,
Round Rock, Tex. 78664
Continuation of abandoned application Ser. No. 67,894, Aug. 28, 1970. This application July 14, 1972, Ser. No. 271,701
Int. Cl. C05f 11/08
U.S. Cl. 71—9    3 Claims

ABSTRACT OF THE DISCLOSURE

A selective biochemical destruction of the viable portion of selected type plant material provides a liquid composition with microscopic sized particulate organic material therein, which liquid composition improves the mechanical characteristics of soil and the plant growth supporting characteristics thereof.

This is a continuation of application Ser. No. 67,894, filed Aug. 28, 1970, now abandoned.

BACKGROUND OF THE INVENTION

The field of art to which this invention pertains is fertilizers containing bacterial matter, with some fermentation utilizing animal matter and other organic material.

Description of the prior art

The prior art has treated certain desert plants, such as opunta, as pests because of their capacity to grow and flourish under such adverse conditions as to displace other plants less able to survive under such conditions, with the resultant harm produced by such plants to livestock by the displacement of plants more readily ingested and digested by livestock.

Clayey soils compact and water cannot then penetrate such soil on drying or crusting of their surface; such is also the case with silty soil. Rainfall collects as pools of water on such surfaces and then "runs off" as large bodies of water carrying off small size particles of soil therewith and thereby reduces the productive capacity of such soils.

The prior art preparation of the soil has been to mechanically overturn portions of the soil as by plowing and thereby create very large lumps of soil followed by reduction in size of such overturned lumps by successive harrowing in order to provide soil aeration water receptivity and water retentivity. Such methods are time-consuming and labor-consuming and wasteful of energy and do not positively change the ratio of voids to solid material.

SUMMARY OF THE INVENTION

The particle size distribution in the soil is reconstituted and bacteria added to improve the water receptivity and aeration of the soil. This is done by development of microscopic flora in a liquor to form a biochemical reaction zone in which a mass of microscopically sized treated plant portions and local protista are obtained. This mass of microscopically sized treated components is applied as a liquor; the plant components adhere to the surface of soil particles of small size, e.g. 0.005 to 0.05 mm., with corresponding small interstices therebetween and cause such particles to form aggregates of substantially larger size i.e. of an average size of about .05 to 0.20 mm., with correspondingly greater void spaces between such aggregates. This reconstitution of the particle size distribution and the creation of larger size void spaces between the earth particles rapidly yet relatively permanently improves the water receptivity and retentivity of such soils and improves the aeration of the soil and the plant growth supporting capacity of the soil very substantially, even without plowing, as well as increasing the "softness" of the soil.

DESCRIPTION OF THE PREFERRED EMBODIMENT

Figure 1:
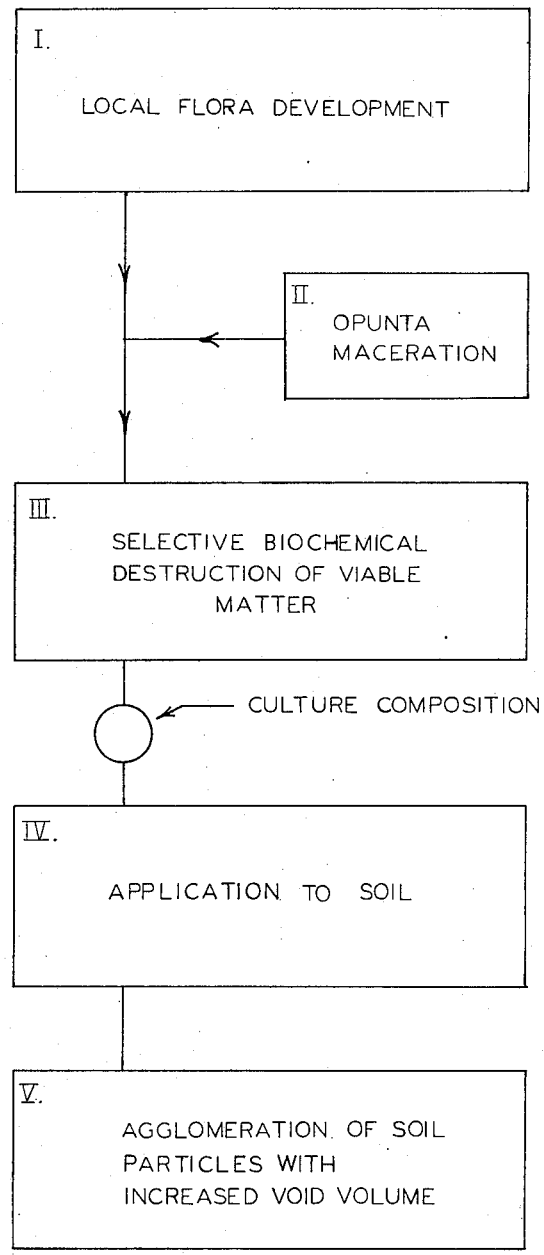
FIG. 1 is a flow chart of the process of this invention.

As diagrammatically represented in FIG. 1 the process herein comprises:

(a) a first stage (I) of developing local flora or protista at 95 to 105° F. in a vat or bath to a stage sufficiently robust to destroy subsequently added desert type plant root as opunta, followed by, (b) addition of macerated desert type plant (stage II) material, including the roots, stems and leaves, as opunta, and (c) digesting at 95 to 105° F. such macerated material in the vat or bath at stage III until an oily slick develops and the viable or reproducible portion of the opunta is destroyed but before the enzyme system and particles developed from the digestion of the macerated opunta lose their ability to adhere to soil particles, and appear and act as described hereinbelow, section entitled "Use of the Culture Composition,"

(d) following the development of such a culture composition, the culture composition is applied to soil (stage IV) and whereupon (stage V) it loosens the packed soil particles and forms them into agglomerates with substantial void spaces therebetween which thereby increases the soil capacity for water reception and retention as well as increasing the void space portion thereof and providing in such soil an innoculation of robust bacteria of local origin. Such treated soil provides an improved substrate or support for the growth of agricultural products.

EXAMPLE I

According to one method of manufacture of composition for use in the process of this invention fifty gallons of water are put into a clean tank to let to set for twelve to twenty-four hours while open to the air whereby local flora may contaminate it. To this are added, with agitation, one gallon of black strap molasses; four pounds of finely crushed stone such as glauconite; one pound of commercial chicken feed such as is sold under the trademark Purina; and, after boiling thereof for about ten minutes, one pound of poultry droppings; two pounds of eighty-five percent, commercial grade, orthophosphoric acid and a tablespoonful of zinc sulfate: to this mixture five gallons of local pond water or one or two pounds of macerated local vegetation plus soil to provide some local protista. The temperature is maintained for ninety-five to a hundred and five degrees Fahrenheit mixed as by manual paddling. The beginning culture is brownish in color, with the viscosity of water, and has the odor of fermented grain in a brewery, and is aerated during mixing.

The mixing by aeration and stirring is continued for eight to twelve hours following which about fifteen pounds well macerated opunta is added. The maximum size of the macerated opunta particles, which particles are obtained by maceration of the leaves, roots and stems is, preferably, less than 2.0 mm. In this process the local flora are developed in the aerated bath and addition of the macerated desert type plant material to the beginning culture occurs after the aeration starts.

Prior to the adding of the opunta the culture is brownish in color, a cross of Roscolene 882 ("Light Chocolate") and Roscolene 810 ("No Color Amber") and has the viscosity of pure water; such combination of color is also the same color as "Raw Umber" #45, Chart B between pp. 540 and 541 of Webster's New International Dictionary Second Edition Unabridged, G. & C. Merriam Company, publishers, Springfield, Mass., 1961. The viscosity increases proportional to the amount of maceration of the opunta added to the culture and initially a viscosity of about S.A.E. 15 is obtained and a fermenting odor dominates; but this ferment odor declines and the smell becomes positively putrefactive and the viscosity declines to S.A.E. 1 and the color changes to a gray-green. The color of the culture changes to a cross between Roscolene No. 882, "Light Chocolate," and Roscolene No. 880, "Light Gray," such combination of color is also the same color as "Plum" #101, Chart B above described, after about four hours, when (four hours later) the culture is substantially clear of any collection of amorphous yellowish material. Fifty hours after the initial addition of the opunta, the culture color is a cross of Roscolene 880 "Light Gray" and Roscolene 869 "Pale Yellow-Green" (such combination of color is also the same color as "Olive Grreen #56," Chart B above described) and some amorphous yellow cellular material such as is shown on FIG. 3 hereof is observed. Eighty hours after addition of the opunta there is some deepening and the color at this point is the same cross of Roscolene 880 ("Light Gray") and Roscolene 869 ("Pale Yellow-Green"). After four to five days after adding of the opunta the color of the culture is still gray-green; when such color is achieved and the culture is not agitated for a few hours and oily particles float to the top of the culture, the culture is ready for harvest. At this point the culture has the characteristics given in Table I hereinbelow. The above crosses of colors are halfway between each of the mentioned colors, i.e. the optical result of 50% of each of the mentioned colors. The finished culture is hereinbelow referred to as the culture composition.

Figure 2:
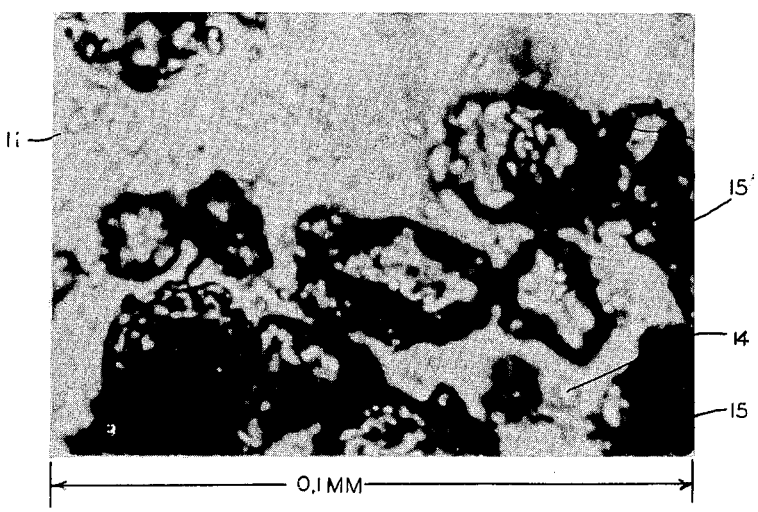
FIG. 2 is a high power magnification photomicrograph, taken by reflected light, of individual soil particles at an initial stage of action of the culture composition thereon.
Figure 3:
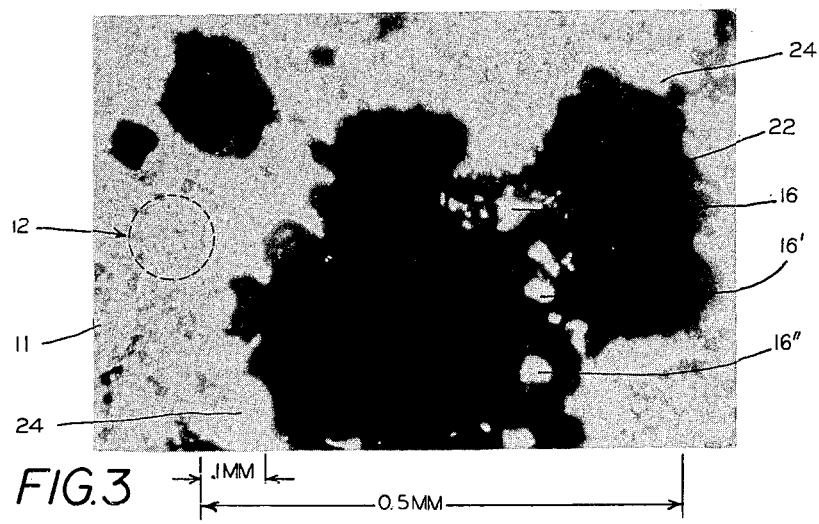
FIG. 3 is a photomicrograph by transmitted light at medium magnification of agglomerates of soil particles and culture particles showing the arrangement thereof at a slightly later stage of action of the culture composition thereon than in FIG. 2.

Under the microscope at about 50× magnification a drop of the culture composition 10 appears as shown in zone 12 of FIG. 3, with a large number of small yellow non-nucleated particles substantially uniform in size and relatively uniformly dispersed throughout a liquid 11. The individual particles as 14 are shown in FIG. 2 although the array of such particles is better shown in FIG. 3.

USE OF THE CULTURE COMPOSITION

The action of the culture composition as the four to five day product hereinabove described may be observed by the naked eye, by microscope and by improved plant growth.

Figure 4:
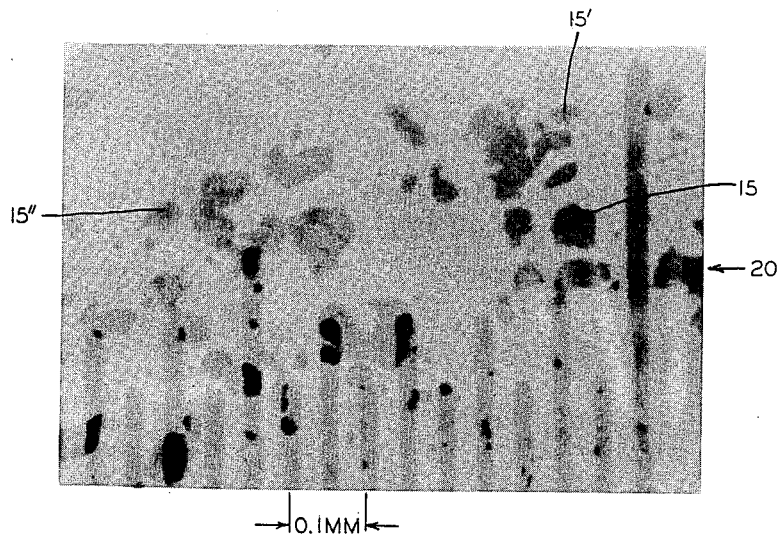
FIG. 4 is a photomicrograph taken by transmitted light at medium magnification of particles of soil showing the arrangement thereof prior to action therein by the culture composition.

Application of a drop of such culture composition, 10, to a one milligram sample 20 of soil dispersed so that the particles thereof generally are arranged in a layer no more than one particle thick and either separate from each other or having only one single point of contact with a neighboring particle or contacting only two neighboring particles at diametrically opposite points (substantially diametrically opposite points on one given particle) as shown in the array of soil particles as 15, 15', 15" in FIG. 4, results in the rapid transformation of such dispersed array of particles into a group of agglomerates of such particles as the agglomerates 22 and 22' of FIG. 3.

More particularly, as observed by the microscope by transmitted light as shown in FIG. 2, the individual particle as 14 adjacent to the soil particles adhere to such adjacent soil particles within two seconds and, after the adherence of a first group or layer of such culture particles to the soil particle surface, the thus coated soil particle (shown by reflected light in FIG. 2) move together to form aggregates which approximate globular shapes such as shown in FIG. 3, as shown in FIG. 3, the culture particles are removed, i.e. stripped, from the clear zone 24 immediately adjacent to the particles as 22 and adhere to the soil particles as 22 and leaves a relatively empty zone 24. Agitation of the soil particles which contact the culture particles as 14 causes further removal of the culture particles from the uniformly dispersed state as at zone 12 of FIG. 3 to a concentration on the surfac of the soil particles, as shown in FIGS. 2 and 3.

FIG. 2 shows, as seen by reflected light, the culture particles adherent to individual soil particles and the soil particles at an enrly stage of coalescence. The coalescence is best shown in FIG. 5, which is shown by reflected light, wherein the black areas are those in which there are substantially no soil particles and the solution is relatively clear while the bright reflection shows the presence of agglomerates 22 of soil particles and the culture particles; the agglomerating particles progressively completely surround and obliterate the holes as 16, 16', and 16" therein between individual particles as 15', 15' as the agglomerates, as 22, 22' and 22" draw together but the spaces between agglomerates increases.

Figure 5:
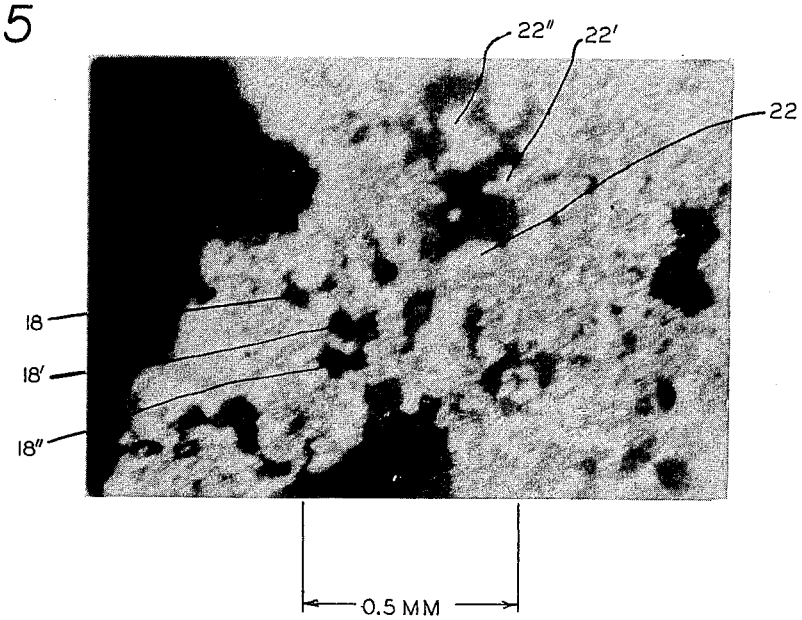
FIG. 5 is a photomicrograph taken by reflected light at somewhat lower power than shown in FIG. 3 showing the agglomerates of soil particles and culture particles showing the arrangement thereof at a slightly later stage of action of culture composition thereon than is shown in FIG. 3.

A liquid culture formed by all the steps of Example 1 but without the addition of the opunta macerate does not show a particle array as in the zone 12 of FIG. 3 nor separate particles as 14 in FIG. 2 nor the action above described on soil particles material as shown in FIGS. 2, 3 and 5. Particles 14 are also referred to herein as culture particles. The effect of the culture particles is enhanced by the presence of water; accordingly, after rainfall on soil particles to which the culture particles are attached, the soil particles form larger aggregates with larger void spaces therebetween with increased water receptivity and retentivity.

The effect of the culture composition is observed by spraying a clay-textured soil (defined as in "Soil," Department of Agriculture Yearbook, 1957, p. 754) on a soil test patch three feet long and about two feet wide, which test patch has cracks of 1/32 to 1/16 of an inch wide and outlining irregular polygonal areas of two to four inches in major diameter and perhaps one to three inches in a minor diameter. One half fluid ounce of the culture composition is applied to the test patch area of three feet length by one foot width and the same amount of water is applied to the control patch area adjacent thereto and of the same size and soil texture, as far as can be determined by eye.

To apply the culture composition it is sprayed on to the surface of the earth. A commercial hand sprayer is adequate and the amount of liquid sprayed on the earth is enough to visibly dampen the soil. One side of the test patch, 3 feet by 1 foot, is coated with water; the other side is coated with the culture composition over a total period of about 5 minutes. The same volume of water is used on each side and the application rate is, as close as possible, the same on both test patch portions, which are otherwise the same. Immediately after treatment by the culture composition the treated soil should feel damp to the touch. Within twenty minutes after such spraying there is visible to the naked eye a filling of the cracks in between the outlined areas of soil where sprayed by the culture composition, but not where sprayed with water alone.

The water loosens the closely packed particles and provides some motility thereto, following which the particle as 15, 15', 15" are agglomerated to form the larger units as 22, 22', 22" with void spaces of increased size therebetween. The culture composition accordingly acts on the soil to rearrange the particles in close packed array into loose globular aggregates with increased volume of voids (or void spaces). The aggregates as 22 which appear complete by transmitted light are not of even a continuous density throughout but rather have small void spaces (residues of 16, 16' and 16") between particles of the agglomerates as well as there being the larger void spaces as 18, 18', 18" between the agglomerates as 22. The use of local flora provides bacterial components that flourish in the local soil, apparently amongst the organic residue between particles in the agglomerates.

Within forty-five minutes there is a clearly visible filling of the cracks where sprayed by the culture composition indicating a swelling of the earth has taken place between the area outlined by the cracks. There is no such filling where the test patch portion is treated by the water alone. The zone treated by the culture is, as tested by a finger, softer than the same like test patch area which had not been treated by the culture composition.

This increased particle softness of the earth treated as described is also corroborated by the increased worm population which develops in ground treated with this culture composition. Also, after grass grows over an area by the culture composition (one gallon per 150 square yards) and one rides over the thus treated area in an automobile one can readily determine when one has passed over the area that has been treated by the culture composition and has entered over the area which has been not so treated because the area treated by the culture composition is sufficiently soft to be felt as distinguishably softer to one riding in an automobile over such treated area.

TABLE I.—CHEMICAL CHARACTERISTICS OF THE CULTURE COMPOSITION

| | Filtered,[1] mg./liter | Unfiltered |
|---|---|---|
| Biological oxygen demand [2] | 11,850 | 12,000 mg./liter. |
| Chemical oxygen demand [3] | 18,475 | 19,800 mg./liter. |
| Oxygen up-take | | 68 mg./liter/hr. |

[1] Glass fiber filter, pore size >0.1 mm.
[2] By standard method for examination of water and waste water. American Public Health Association, American Water Works Association, and Water Polution Control Federation, 12th edition, second printing, page 415, expressed in milligrams of oxygen per liter of sample. Five-day test.
[3] Same text as "a", p. 510, expressed as milligrams/liter of sample.

In regard to the process illustrated in FIG. 1, the macerated opunta produced at stage II will produce opunta if planted in the earth; however the culture composition produced at end of stage III will not produce opunta.

In view of the above it is believed that the matter of the opunta capable of growth is destroyed by the fermentation bath so that the opunta insofar as it might have been a growing material is killed and forms a relatively oily phase which serves as a reservoir of the ingredient between such phase formed by the killed active material and the water in which the active ingredient is located. This destruction of living matter thereby avoids the damaging effect of the opunta or the like while the beneficial, soil particle agglomerating and void producing, effects of such plant is preserved. The phase provided for by the killed cells also provides for longer-lasting action than would be the case if only an extract were used without the benefit of the reservoir or partition coefficient effect provided by the killed matter.

Varying amounts of the desert plant material may be used other than the particular quantities set out in Example I, e.g. 20 pounds rather than 15 pounds.

In regard to Steps IV and V of FIG. 1, the application of the culture composition of Example I causes, for instance, as an example of its utility, Bermuda grass to grow on soil where there had been no previous success in effecting such growth and on "dead spots" notwithstanding diligent fertilizer and water application thereto on such previous attempts.

While the process is herein disclosed for opunta, a prickly pear in particular in Example I, other desert plants of the cactus family or family Cactaceae (Gray's Manual of Botany, 8th ed., p. 1043), as are known as xerophytic plants may be used in place of the opunta as hereinabove described.

I claim:
1. Process of conditioning soil comprising the steps of
   (a) developing protista in a beginning culture bath and aerating said bath at a temperature of 95 to 105° F.,
   (b) adding macerated desert type plant material to said beginning culture bath after aeration begins thereby raising the viscosity of said bath,
   (c) digesting said macerated material in said bath at 95 to 105° F. while the viscosity thereof is substantially reduced and a putrefactive odor develops and small yellow non nucleated particles substantially uniform in size develop and a second phase insoluble in the digesting mixture becomes visually noticeable thereby forming a finished culture composition,
   (d) applying the finished culture composition to soil including packed soil particles, and
   (e) thereby loosening packed soil particles and forming them into agglomerates with substantial void spaces therebetween, thereby increasing the soil capacity for water reception and retention as well as increasing the void space portion thereof and providing in such soil an inoculation of robust bacteria.

2. Process as in claim 1 wherein an opunta type desert plant is employed.

3. Process as in claim 1 wherein the desert type plant is xerophytic.

References Cited
UNITED STATES PATENTS 2,320,060    5/1943    Barlow et al. _____ 71—23
2,658,824    11/1953   Dickenson _____ 71—1

SAMIH N. ZAHARNA, Primary Examiner

R. BARNES, Assistant Examiner

U.S. Cl. X.R.

71—23